(12) United States Patent
Nagatsuka et al.

(10) Patent No.: US 10,910,884 B2
(45) Date of Patent: *Feb. 2, 2021

(54) ELECTRIC POWER CHARGE AND DISCHARGE SYSTEM

(71) Applicant: Semiconductor Energy Laboratory Co., Ltd., Atsugi (JP)

(72) Inventors: Shuhei Nagatsuka, Atsugi (JP); Akihiro Kimura, Takamatsu (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/876,082

(22) Filed: May 17, 2020

(65) Prior Publication Data

US 2020/0350786 A1 Nov. 5, 2020

Related U.S. Application Data

(63) Continuation of application No. 15/822,483, filed on Nov. 27, 2017, now Pat. No. 10,658,877, which is a
(Continued)

(30) Foreign Application Priority Data

Oct. 31, 2006 (JP) .................................. 2006-296964

(51) Int. Cl.
*H02J 7/00* (2006.01)
*H02J 50/40* (2016.01)
(Continued)

(52) U.S. Cl.
CPC ............. *H02J 50/40* (2016.02); *H01M 10/44* (2013.01); *H02J 7/00* (2013.01); *H02J 50/10* (2016.02); *H02J 50/27* (2016.02); *H04B 1/3883* (2013.01)

(58) Field of Classification Search
CPC ...................................................... H02J 50/40
(Continued)

(56) References Cited

U.S. PATENT DOCUMENTS 5,627,448 A  5/1997  Okada et al.
5,949,213 A  9/1999  Lanni
(Continued)

FOREIGN PATENT DOCUMENTS

CN   002563812 Y   7/2003
JP   09-001968 A   1/1997
(Continued)

OTHER PUBLICATIONS

Chinese Office Action (Application No. 201210188715.5) dated Dec. 25, 2013.

*Primary Examiner* — Yalkew Fantu
(74) *Attorney, Agent, or Firm* — Robinson Intellectual Property Law Office; Eric J. Robinson

(57) ABSTRACT

An electric power charge and discharge system for an electronic device having a battery, by which the electronic device can be used for a long period of time. In a wireless communication device including a wireless driving portion including a first battery and a wireless charging portion including a second battery, the first battery is charged by electric power from a fixed power supply and the second battery is charged by using electromagnetic waves existing in an external space. Further, the first battery and the second battery are discharged alternately, and during a period in which the first battery is discharged, the second battery is charged.

12 Claims, 10 Drawing Sheets

Related U.S. Application Data continuation of application No. 14/208,844, filed on Mar. 13, 2014, now Pat. No. 9,831,707, which is a continuation of application No. 13/288,316, filed on Nov. 3, 2011, now Pat. No. 8,674,655, which is a continuation of application No. 13/032,850, filed on Feb. 23, 2011, now Pat. No. 8,054,037, which is a continuation of application No. 12/893,497, filed on Sep. 29, 2010, now Pat. No. 7,898,215, which is a continuation of application No. 11/976,376, filed on Oct. 24, 2007, now Pat. No. 7,808,206.

(51) Int. Cl.
    *H02J 50/10*   (2016.01)
    *H02J 50/27*   (2016.01)
    *H04B 1/3883*  (2015.01)
    *H01M 10/44*   (2006.01)

(58) Field of Classification Search
    USPC .......................................................... 320/108
    See application file for complete search history.

(56) References Cited

U.S. PATENT DOCUMENTS

| | | | |
|---|---|---|---|
| 5,963,012 A | 10/1999 | Garcia et al. | |
| 6,223,990 B1 | 5/2001 | Kamei | |
| 6,509,217 B1 | 1/2003 | Reddy | |
| 6,737,302 B2 | 5/2004 | Arao | |
| 6,914,416 B2 | 7/2005 | Thomas et al. | |
| 6,917,182 B2 | 7/2005 | Burton et al. | |
| 6,936,994 B1 | 8/2005 | Gimlan | |
| 6,986,965 B2 | 1/2006 | Jenson et al. | |
| 7,284,703 B2 | 10/2007 | Powell et al. | |
| 7,374,101 B2 | 5/2008 | Kaneko | |
| 7,433,655 B2 | 10/2008 | Jacobs et al. | |
| 7,652,359 B2 | 1/2010 | Takayama et al. | |
| 7,710,270 B2 | 5/2010 | Shionoiri et al. | |
| 7,737,658 B2 | 6/2010 | Sennami et al. | |
| 7,898,215 B2 | 3/2011 | Nagatsuka et al. | |
| 7,965,180 B2 * | 6/2011 | Koyama | G16H 40/63 340/539.12 |
| 2002/0037756 A1 | 3/2002 | Jacobs et al. | |
| 2002/0049714 A1 | 4/2002 | Yamazaki et al. | |
| 2004/0002825 A1 | 1/2004 | Raichle et al. | |
| 2005/0017677 A1 | 1/2005 | Burton et al. | |
| 2005/0254183 A1 | 11/2005 | Ishida et al. | |
| 2006/0009251 A1 | 1/2006 | Noda et al. | |
| 2006/0012464 A1 | 1/2006 | Nitzan et al. | |
| 2006/0025897 A1 | 2/2006 | Shostak et al. | |
| 2007/0194750 A1 | 8/2007 | Eager et al. | |
| 2007/0216348 A1 | 9/2007 | Shionoiri et al. | |
| 2007/0278998 A1 * | 12/2007 | Koyama | H02J 7/025 320/109 |
| 2009/0184165 A1 | 7/2009 | Bertness et al. | |
| 2009/0187495 A1 | 7/2009 | Bertness et al. | |
| 2009/0212781 A1 | 8/2009 | Bertness et al. | |

FOREIGN PATENT DOCUMENTS

| | | |
|---|---|---|
| JP | 10-307898 A | 11/1998 |
| JP | 2001-045677 A | 2/2001 |
| JP | 2001-190029 A | 7/2001 |
| JP | 2002-231545 A | 8/2002 |
| JP | 2003-006592 A | 1/2003 |
| JP | 2003-070187 A | 3/2003 |
| JP | 2003-158651 A | 5/2003 |
| JP | 2003-218624 A | 7/2003 |
| JP | 2003-274569 A | 9/2003 |
| JP | 2003-299255 A | 10/2003 |
| JP | 2004-343410 A | 12/2004 |
| JP | 2005-150022 A | 6/2005 |
| JP | 2005-210843 A | 8/2005 |
| JP | 2005-316724 A | 11/2005 |
| JP | 2005-352434 A | 12/2005 |
| JP | 2005-354888 A | 12/2005 |
| JP | 2006-024087 A | 1/2006 |
| JP | 2006-503376 | 1/2006 |
| WO | WO-1997/000493 | 1/1997 |

* cited by examiner

ELECTRIC POWER CHARGE AND DISCHARGE SYSTEM

BACKGROUND OF THE INVENTION

I. Field of the Invention

The present invention relates to an electric power charge and discharge system. In particular, the present invention relates to an electric power charge and discharge system which supplies electric power to a battery noncontactly by receiving a wireless signal.

2. Description of the Related Art

Various electronic devices are coming into wide use, and a wide variety of products are in the marketplace. In particular, in recent years, the spread of portable electronic devices for outdoor use has been remarkable. For example, mobile phones, digital video cameras, and the like have become very convenient because of high-definition display portions, increased durability of batteries, and further reduction in power consumption. A portable electronic device has a structure in which a battery that is a charging means is incorporated. Power source voltage for driving the portable electronic device can be ensured by the battery. As the battery, a secondary battery such as a lithium ion battery has been used, and the battery has been charged directly from an AC adaptor which is plugged into an AC power supply which is wired inside a building or the like (hereinafter referred to as a fixed power supply) (see Patent Document 1: Japanese Published Patent Application No. 2005-150022).

In addition, research on simple charging of a battery with a noncontact means, in which electromagnetic coupling is used with an external electric power supply means has been performed (see Patent Document 2: Japanese Published Patent Application No. 2001-190029).

However, while the frequency in use of electronic devices such as mobile phones, digital video cameras, and the like has been rising and the demand for improvement of hours of use of a battery has been increasing, improvement of charging capability of the battery in accordance with the hours of use of the battery has limitations. Further, the AC adaptor for charging the battery which is a power supply incorporated in such a mobile phone, a digital video camera, or the like is too large to be carried along easily.

Further, noncontact charging utilizing electromagnetic coupling can be performed only in the periphery of a battery charger, and moreover, electric power is needed to be supplied from a fixed power supply. Therefore, it may be necessary to carry the battery charger along, and the burden caused by doing so remains.

In addition, unlike the case where electric power is supplied from a fixed power supply, the electronic devices having the battery continuously consume electric power accumulated in the battery and the hours of use has limitations. Therefore, there is a problem in that improvement of hours of use of the battery largely depends on the improvement of charging capability of the battery and long hours of use of the electronic devices has limitations.

SUMMARY OF THE INVENTION

In view of the above, it is an object of the present invention to provide an electric power charge and discharge system for an electronic device having a battery, by which the electronic device can be used for a long period of time.

In order to solve the foregoing problems, according to the electric power charge and discharge system of the present invention, in a wireless communication device including a wireless driving portion including a first battery and a wireless charging portion including a second battery, the first battery is charged by electric power from a fixed power supply and the second battery is charged by using electromagnetic waves existing in an external space. Further, the first battery and the second battery are discharged alternately, and during a period in which the first battery is discharged, the second battery is charged.

According to one feature of the electric power charge and discharge system of the present invention, in a wireless communication device including a wireless driving portion including a first battery which is charged by electric power from a fixed power supply and a wireless charging portion including a second battery which is charged by using electromagnetic waves existing in an external space, the first battery and the second battery are discharged alternately, and during a period in which the first battery is discharged, the second battery is charged.

According to another feature of the electric power charge and discharge system of the present invention, in a wireless communication device including a wireless driving portion including a first battery which is charged by electric power from a fixed power supply and a wireless charging portion including a second battery which is charged by using electromagnetic waves existing in an external space, an antenna for receiving the electromagnetic waves in the wireless charging portion doubles as an antenna for transmitting and receiving an external signal in the wireless driving portion; the first battery and the second battery are discharged alternately; and during a period in which the first battery is discharged, the second battery is charged.

According to another feature of the electric power charge and discharge system of the present invention, in a wireless communication device including a wireless driving portion including a first battery which is charged by electric power from a fixed power supply and a wireless charging portion including a second battery which is charged by using electromagnetic waves existing in an external space, an antenna for receiving the electromagnetic waves in the wireless charging portion is provided in the wireless charging portion separately from an antenna for transmitting and receiving an external signal in the wireless driving portion; the first battery and the second battery are discharged alternately; and during a period in which the first battery is discharged, the second battery is charged.

According to another feature of the electric power charge and discharge system of the present invention, in a wireless communication device including a wireless driving portion including a first battery which is charged by electric power from a fixed power supply and a wireless charging portion including a second battery which is charged by using electromagnetic waves existing in an external space, an antenna for receiving the electromagnetic waves in the wireless charging portion doubles as an antenna for transmitting and receiving an external signal in the wireless driving portion; the first battery and the second battery are discharged alternately; during a period in which the first battery is discharged, the second battery is charged; and a charge switching circuit for switching such that the second battery is charged by electric power from the fixed power supply during a period in which the wireless driving portion is connected to the fixed power supply is provided.

According to another feature of the electric power charge and discharge system of the present invention, in a wireless communication device including a wireless driving portion including a first battery which is charged by electric power from a fixed power supply and a wireless charging portion including a second battery which is charged by using electromagnetic waves existing in an external space, an antenna for receiving the electromagnetic waves in the wireless charging portion is provided in the wireless charging portion separately from an antenna for transmitting and receiving an external signal in the wireless driving portion; the first battery and the second battery are discharged alternately; during a period in which the first battery is discharged, the second battery is charged; and a charge switching circuit for switching such that the second battery is charged by electric power from the fixed power supply during a period in which the wireless driving portion is connected to the fixed power supply is provided.

According to another feature of the electric power charge and discharge system of the present invention, in a wireless communication device including a wireless driving portion including a first battery which is charged by electric power from a fixed power supply and a wireless charging portion including a second battery which is charged by using electromagnetic waves existing in an external space, an antenna for receiving the electromagnetic waves in the wireless charging portion is an external antenna for transmitting and receiving an external signal in the wireless driving portion; the first battery and the second battery are discharged alternately; and during a period in which the first battery is discharged, the second battery is charged.

According to another feature of the electric power charge and discharge system of the present invention, in a wireless communication device including a wireless driving portion including a first battery which is charged by electric power from a fixed power supply and a wireless charging portion including a second battery which is charged by using electromagnetic waves existing in an external space, an antenna for receiving the electromagnetic waves in the wireless charging portion is an external antenna for transmitting and receiving an external signal in the wireless driving portion; the first battery and the second battery are discharged alternately; during a period in which the first battery is discharged, the second battery is charged; and a charge switching circuit for switching such that the second battery is charged by electric power from the fixed power supply during a period in which the wireless driving portion is connected to the fixed power supply is provided.

Further, the wireless driving portion of the present invention may be provided with a charge controlling circuit for controlling charging to the first battery.

Further, the wireless charging portion of the present invention may include an internal circuit and may be provided with a power supply switching circuit for switching between electric power from the first battery and the second battery, which is supplied to the internal circuit.

Further, the wireless charging portion of the present invention may be provided with a wireless charge controlling circuit for controlling charging to the second battery.

By the electric power charge and discharge system of the present invention, improvement in the hours of use of a battery can be achieved. Therefore, the frequency of carrying along an AC adapter for charging the battery can be reduced.

Further, by the electric power charge and discharge system of the present invention, a battery can be charged noncontactly without using a battery charger. Therefore, an electronic device can be driven even in the state where an AC adapter for charging the battery does not exist.

DETAILED DESCRIPTION OF THE INVENTION

Figure 1:
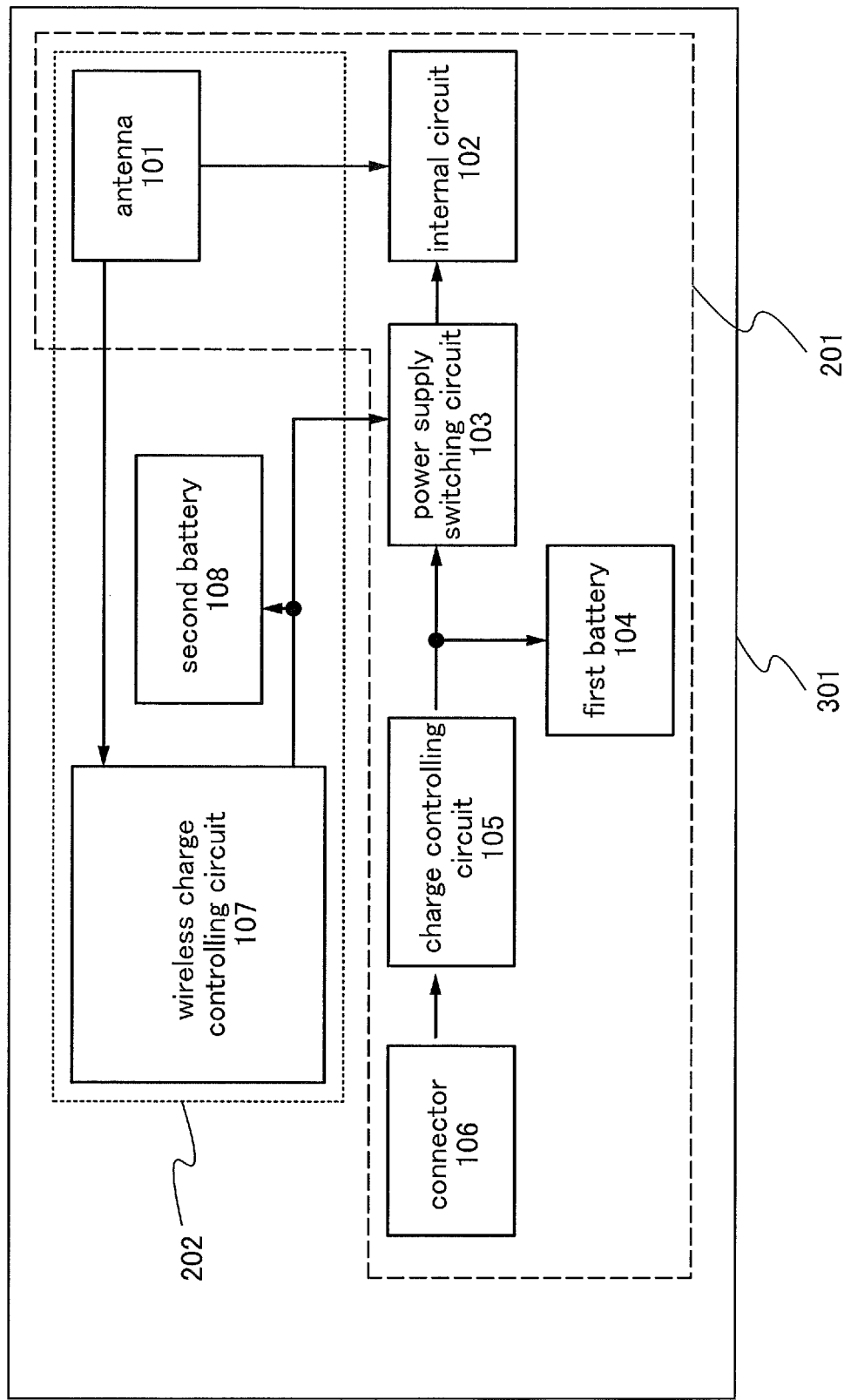
FIG. 1 is a diagram showing a structure of Embodiment Mode 1.

Although the present invention will be fully described by way of embodiment modes with reference to the accompanying drawings, it is to be understood that various changes and modifications will be apparent to those skilled in the art. Therefore, unless such changes and modifications depart from the scope of the present invention, they should be construed as being included therein. Note that throughout the drawings, common reference numerals are used for common structures of the present invention described herein.

Embodiment Mode 1

In this embodiment mode, a structure of a wireless communication device which performs the electric power charge and discharge system of the present invention is described below with reference to drawings.

FIG. 1 is a block diagram of the wireless communication device which performs the electric power charge and discharge system of the present invention. In FIG. 1, a wireless communication device 301 includes a wireless driving portion 201 and a wireless charging portion 202. The wireless driving portion 201 includes an antenna 101, an internal circuit 102, a power supply switching circuit 103, a first battery 104, a charge controlling circuit 105, and a connector 106. The wireless charging portion 202 includes the antenna 101, a wireless charge controlling circuit 107, and a second battery 108.

The antenna 101 shown in FIG. 1 performs signal transmission and reception when the wireless communication device 301 performs wireless communication, and corresponds to a system determined by its wireless communication standard. As the antenna 101, a loop antenna, a dipole antenna, a slot antenna, a monopole antenna, a notch antenna, a patch antenna, or the like can be used. The shape of the antenna may be selected in accordance with the system determined by the wireless communication standard; in accordance with the wireless communication standard, an antenna with the optimal length and shape may be provided.

Note that as for the antenna 101 provided in the wireless communication device 301 of the present invention, antennas with different shapes are combined together for reception of electromagnetic waves in a plurality of frequency bands may be applied. By providing antennas with different shapes, a wireless communication device corresponding to a plurality of wireless communication standards can be realized.

The internal circuit 102 shown in FIG. 1 demodulates a wireless communication signal received by the antenna 101, and performs an operation specified in the wireless communication device 301. Further, when signal transmission from the wireless communication device 301 is performed as needed, a transmission signal is modulated and transmitted to the antenna 101 as a transmission signal. Electric power required for operating the internal circuit 102 is supplied by either of the first battery 104 and the second battery 108 selected by the power supply switching circuit 103.

The first battery 104 shown in FIG. 1 is selected by the power supply switching circuit 103 to supply electric power as an operating power supply of the internal circuit 102.

The charge controlling circuit 105 shown in FIG. 1 converts an AC signal supplied from the connector 106 into a DC signal so as to be a voltage which can charge the first battery 104. As an example of the charge controlling circuit 105, a rectifier circuit, a constant voltage circuit, a constant current circuit, and a diode are provided. The rectifier circuit mainly includes a diode and a smoothing capacitor. The rectifier circuit may be provided with a resistor or a capacitor in order to adjust the impedance. The constant voltage circuit and the constant current circuit convert a signal from the connector 106 to a signal for charging the first battery 104. The diode is provided in order to prevent leaks of electric power from the first battery 104.

The connector 106 shown in FIG. 1 supplies electric power from an external power supply such as a fixed power supply through a cable.

The wireless charge controlling circuit 107 shown in FIG. 1 controls a wireless electric power received by the antenna 101 to a voltage which can charge the second battery 108. As an example of the wireless charge controlling circuit 107, a rectifier circuit, a constant voltage circuit, a boosting circuit, and a diode are provided. The rectifier circuit mainly includes a diode and a smoothing capacitor. The rectifier circuit may be provided with a resistor or a capacitor in order to adjust the impedance. The constant voltage circuit and the boosting circuit perform conversion into a voltage for charging the second battery 108. The diode is provided in order to prevent leaks of electric power from the battery.

Note that although the case where one wireless charge controlling circuit 107 and one second battery 108 are provided in the wireless charging portion 202, other than the antenna 101 which is shared with the wireless driving portion 201 is described in this embodiment mode, pluralities of the wireless charge controlling circuits 107 and the second batteries 108 may be provided as well. By providing pluralities of the wireless charge controlling circuits 107 and the second batteries 108, charging capability of the wireless communication device 301 can be improved.

Further, in the present invention, the first battery 104 and the second battery 108 refer to charging means which can restore a continuous operating period of time by being charged. A secondary battery, a capacitor, and the like can be given as examples of the charging means, which are generically referred to as a battery in this specification. A battery formed with a sheet shape is preferably used as the battery although depending on an intended use. For example, reduction in size is possible with the use of a lithium battery, preferably a lithium polymer battery that uses a gel electrolyte, a lithium ion battery, or the like. Needless to say, any battery may be used as long as it can be charged, and a battery that can be charged and discharged, such as a nickel-metal hydride battery, a nickel cadmium battery, an organic radical battery, a lead storage battery, an air secondary battery, a nickel zinc battery, or a silver zinc battery may be used. Alternatively, a high-capacity capacitor or the like may be used.

It is to be noted that as a high-capacity capacitor that can be used as each of the first battery 104 and the second battery 108 of the present invention, it is preferable to use a capacitor having large opposed areas of electrodes. It is preferable to use a double-layer electrolytic capacitor formed using an electrode material having a large specific surface area, such as activated carbon, fullerene, or a carbon nanotube. As compared with a battery, a capacitor has a simple structure and is easily formed to be thin and stacked. A double-layer electrolytic capacitor is preferable because it has a function of charging, does not deteriorate much even if the frequencies of charging and discharging are increased, and is excellent in rapid charging property.

The second battery 108 shown in FIG. 1 is selected by the power supply switching circuit 103 to supply electric power as an operating power supply of the internal circuit 102. Note that description is made hereinafter under the following condition: the electric power storage capacity of the second battery 108 is smaller than that of the first battery 104 and the electric power storage capacity is different in the first battery 104 and the second battery 108.

Figure 2:
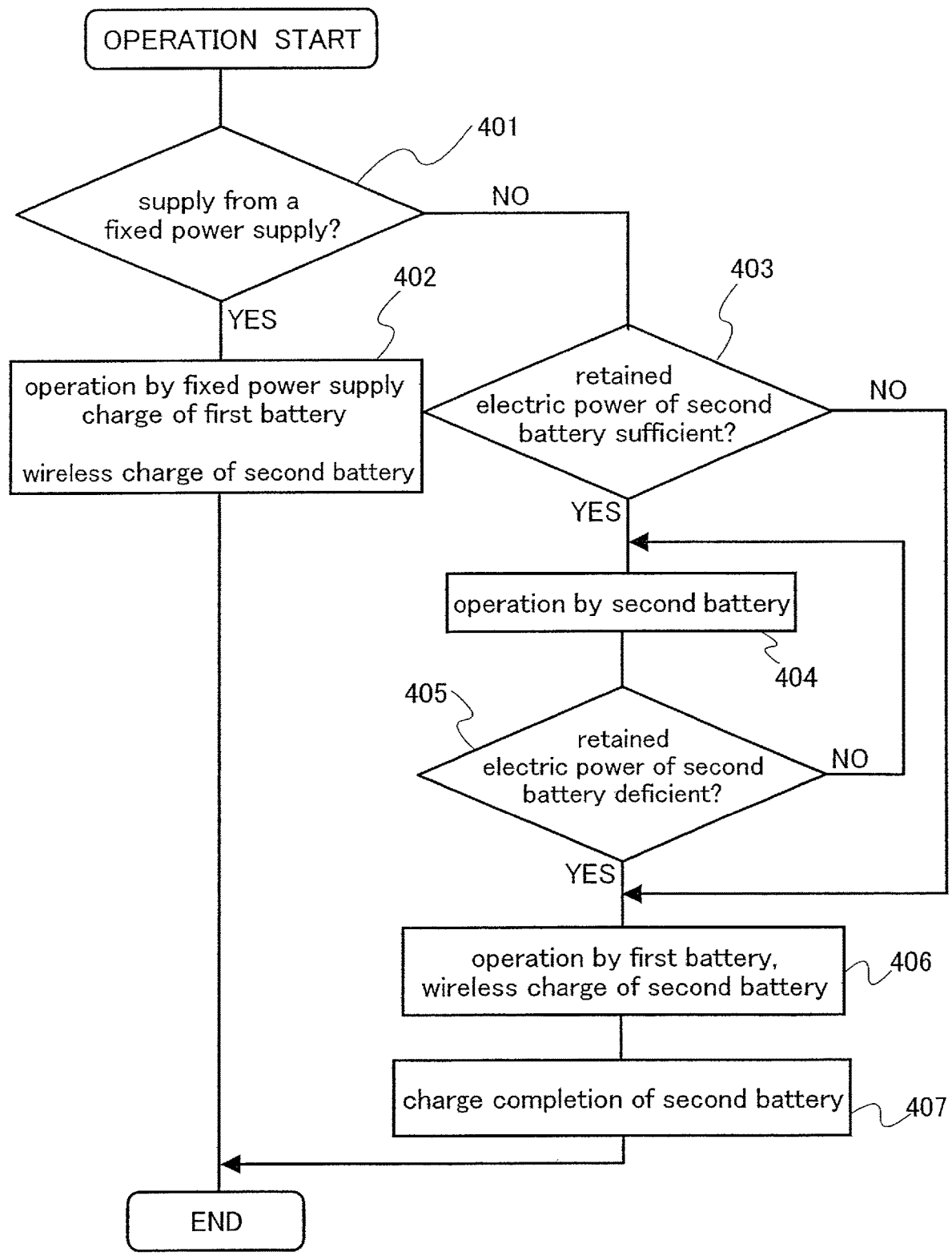
FIG. 2 is a chart describing the structure of Embodiment Mode 1.

The electric power charge and discharge system of the present invention is described using a flow chart of FIG. 2. Whether or not electric power is being supplied from a fixed power supply through the connector 106 is judged (STEP 401). In the case where electric power is being supplied from the fixed power supply (followed by "YES" of STEP 401), the internal circuit 102 is operated by using the electric power from the fixed power supply, and the first battery 104 is charged by electric power transmitted from the connector 106 to the charge controlling circuit 105. In addition, the second battery 108 is charged by an electromagnetic wave supplied from the antenna (STEP 402).

In the case where electric power is not being supplied through the fixed power supply in STEP 401 in FIG. 2 (followed by "NO" of STEP 401), whether or not the electric power capacitance of the second battery 108 is enough to operate the internal circuit 102 is judged (STEP 403). Here, in the case where it is judged that the electric power capacitance of the second battery 108 is enough to operate the internal circuit 102 (followed by "YES" of STEP 403), the power supply switching circuit 103 selects the second battery 108 as an electric power supply source to the internal circuit 102 and operates the internal circuit 102 (STEP 404). In the case where it is judged that the electric power capacitance of the second battery 108 is not enough to operate the internal circuit 102 (followed by "NO" of STEP 403), the power supply switching circuit 103 selects the first battery 104 as an electric power supply source to the internal circuit 102 and operates the internal circuit 102 (STEP 406). At STEP 406, the second battery 108 is charged by receiving an electromagnetic wave with a wireless signal by an operation of the wireless charging portion 202. Note that when the internal circuit 102 is operated by electric power supplying from the second battery 108 at STEP 404, in the case where the electric power capacitance of the second battery 108 is short (followed by "YES" of STEP 405), STEP 406 follows. On the other hand, when the internal circuit 102 is operated by electric power supplying from the second battery 108 at STEP 404, in the case where the electric power capacitance of the second battery 108 is enough (followed by "NO" of STEP 405), STEP 404 follows. Then, at the time when the electric power storage capacitance of the second battery 108 reaches enough electric power storage capacitance to operate the internal circuit 102 by charging with electromagnetic waves existing in an external space, which are supplied from the antenna, charging is completed (STEP 407).

Based on the flow chart of FIG. 2 describing the electric power charge and discharge system of the present invention, an advantage of the present invention is described with reference to FIGS. 3A to 3C. In FIGS. 3A to 3C, as one example, the electric power storage capacity of the first battery 104 is set to (100) and the electric power storage capacity of the second battery 108 is set to (25) (see FIGS. 3A and 3B). Further, in FIGS. 3A to 3C, description is made under condition that a period of time for fully charging the electric power storage capacity of the second battery 108 is equal to a period of time for consuming (30) of the electric power storage capacity of the first battery 104.

The sum of electric power storage capacity of the first battery and the second battery shown in FIGS. 3A and 3B is only (125). According to the electric power charge and discharge system of a wireless communication device of the present invention in which charging and discharging are performed in accordance to the flow chart of FIG. 2, discharging of the second battery, which is denoted by reference numeral 351, and discharging of the first battery, which is denoted by reference numeral 352, are performed alternately, and during the period in which the first battery is discharged, the second battery is charged, so that the sum of electric power storage capacity of the batteries is almost (200) (see FIG. 3C). As described above, it is found that this embodiment mode sufficiently resolves the problem of the short operating period of time of a battery included in a wireless communication device.

As described above, by the electric power charge and discharge system of the present invention, improvement in hours of use of a battery can be achieved. Therefore, the frequency of carrying along an AC adapter for charging the battery can be reduced.

Further, by the electric power charge and discharge system of the present invention, a battery can be charged noncontactly without using a battery charger. Therefore, an electronic device can be driven even in the state where an AC adapter for charging the battery does not exist.

Embodiment Mode 2

In this embodiment mode, a structure of the wireless communication device which performs the electric power charge and discharge system of the present invention described in Embodiment Mode 1, in which an antenna in a wireless charging portion is provided separately from an antenna in a wireless driving portion, is described below with reference to drawings. Note that in the drawings used in this embodiment mode, the same portions as Embodiment Mode 1 are denoted by the same reference numerals in some cases.

Figure 4:
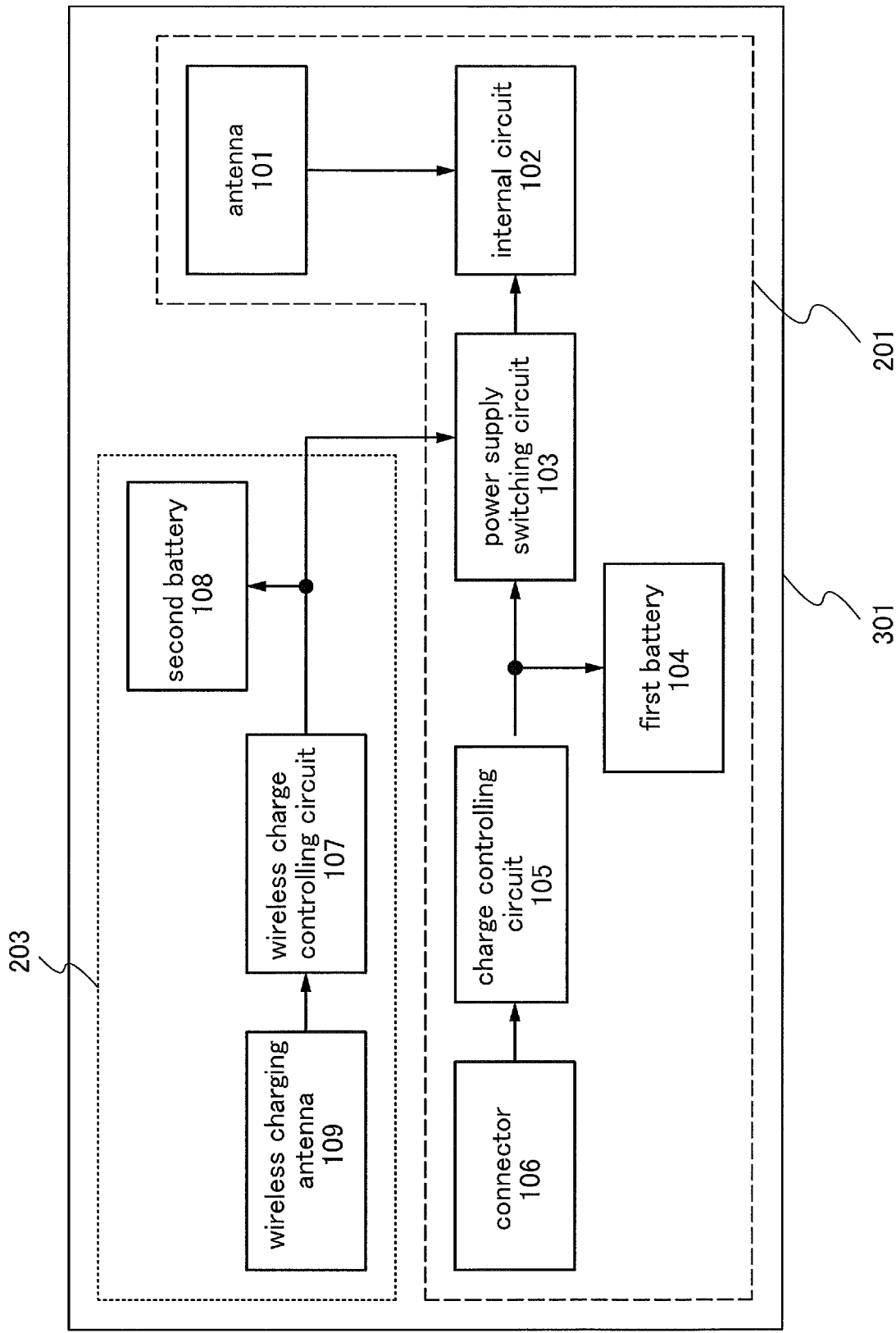
FIG. 4 is a diagram showing a structure of Embodiment Mode 2.

FIG. 4 is a block diagram of the wireless communication device which performs the electric power charge and discharge system of the present invention. In FIG. 4, the wireless communication device 301 includes the wireless driving portion 201 and a wireless charging portion 203. The wireless driving portion 201 includes the antenna 101, the internal circuit 102, the power supply switching circuit 103, the first battery 104, the charge controlling circuit 105, and the connector 106. The wireless charging portion 203 includes the wireless charge controlling circuit 107, the second battery 108, and a wireless charging antenna 109.

The antenna 101 shown in FIG. 4 performs signal transmission and reception when the wireless communication device 301 performs wireless communication, and corresponds to a system determined by its wireless communication standard. As the antenna 101, a loop antenna, a dipole antenna, a slot antenna, a monopole antenna, a notch antenna, a patch antenna, or the like can be used. The shape of the antenna may be selected in accordance with the system determined by the wireless communication standard, in accordance with the wireless communication standard, an antenna with the optimal length and shape may be provided.

The internal circuit 102 shown in FIG. 4 demodulates a wireless communication signal received by the antenna 101, and performs an operation specified in the wireless communication device 301. Further, when signal transmission from the wireless communication device 301 is performed as needed, a transmission signal is modulated and transmitted to the antenna 101 as a transmission signal. Electric power required for operating the internal circuit 102 is supplied by either of the first battery 104 and the second battery 108 selected by the power supply switching circuit 103.

The first battery 104 shown in FIG. 4 is selected by the power supply switching circuit 103 to supply electric power as an operating power supply of the internal circuit 102.

The charge controlling circuit 105 shown in FIG. 4 converts an AC signal supplied from the connector 106 into a DC signal so as to be a voltage which can charge the first battery 104. As an example of the charge controlling circuit 105, a rectifier circuit, a constant voltage circuit, a constant current circuit, and a diode are provided. The rectifier circuit mainly includes a diode and a smoothing capacitor. The rectifier circuit may be provided with a resistor or a capacitor in order to adjust the impedance. The constant voltage circuit and the constant current circuit convert a signal from the connector 106 to a signal for charging the first battery 104. The diode is provided in order to prevent leaks of electric power from the first battery 104.

Note that although the case where one wireless charge controlling circuit 107 and one second battery 108 are provided in the wireless charging portion 203 is described in this embodiment mode, pluralities of the wireless charge controlling circuits 107 and the second batteries 108 may be provided as well. By providing pluralities of the wireless charge controlling circuits 107 and the second batteries 108, charging capability of the wireless communication device 301 can be improved.

Further, in the present invention, the first battery 104 and the second battery 108 refer to charging means which can restore a continuous operating period of time by being charged. A secondary battery, a capacitor, and the like can be given as examples of the charging means, which are generically referred to as a battery in this specification. A battery formed with a sheet shape is preferably used as the battery although depending on an intended use. For example, reduction in size is possible with the use of a lithium battery, preferably a lithium polymer battery that uses a gel electrolyte, a lithium ion battery, or the like. Needless to say, any battery may be used as long as it can be charged, and a battery that can be charged and discharged, such as a nickel-metal hydride battery, a nickel cadmium battery, an organic radical battery, a lead storage battery, an air secondary battery, a nickel zinc battery, or a silver zinc battery may be used. Alternatively, a high-capacity capacitor or the like may be used.

It is to be noted that as a high-capacity capacitor that can be used as each of the first battery 104 and the second battery 108 of the present invention, it is preferable to use a capacitor having large opposed areas of electrodes. It is preferable to use a double-layer electrolytic capacitor formed using an electrode material having a large specific surface area, such as activated carbon, fullerene, or a carbon nanotube. As compared with a battery, a capacitor has a simple structure and is easily formed to be thin and stacked. A double-layer electrolytic capacitor is preferable because it has a function of charging, does not deteriorate much even if the frequencies of charging and discharging are increased, and is excellent in rapid charging property.

The connector 106 shown in FIG. 4 supplies electric power from a fixed power supply such as a household power supply through a cable.

The wireless charge controlling circuit 107 shown in FIG. 4 controls an electromagnetic wave received by the wireless charging antenna 109 to a voltage which can charge the second battery 108. As an example of the wireless charge controlling circuit 107, a rectifier circuit, a constant voltage circuit, a boosting circuit, and a diode are provided. The rectifier circuit mainly includes a diode and a smoothing capacitor. The rectifier circuit may be provided with a resistor or a capacitor in order to adjust the impedance. The constant voltage circuit and the boosting circuit perform conversion into a voltage for charging the second battery 108. The diode is provided in order to prevent leaks of electric power from the battery.

The second battery 108 shown in FIG. 4 is selected by the power supply switching circuit 103 to supply electric power as an operating power supply of the internal circuit 102. Note that description is made hereinafter under the following condition: the electric power storage capacity of the second battery 108 is smaller than that of the first battery 104 and the electric power storage capacity is different in the first battery 104 and the second battery 108.

The wireless charging antenna 109 shown in FIG. 4 is an antenna only for charging the second battery 108, and it is not necessarily an antenna corresponding to a standard of the wireless communication device 301 and is not necessarily the same as the antenna 101. As the wireless charging antenna 109, a loop antenna, a dipole antenna, a slot antenna, a monopole antenna, a notch antenna, a patch antenna, or the like can be used. The shape of the antenna may be selected in accordance with the system determined by the wireless communication standard; in accordance with the wireless communication standard, an antenna with the optimal length and shape may be provided.

Note that as for the wireless charging antenna 109 provided in the wireless communication device 301 of the present invention, antennas with different shapes are combined together for reception of electromagnetic waves in a plurality of frequency bands may be applied. By providing antennas with different shapes, a wireless communication device corresponding to a plurality of wireless communication standards can be realized.

The present invention described in this embodiment mode can be operated in accordance with the flow chart of FIG. 2 as described in Embodiment Mode 1. Therefore, the problem of the short operating period of time of a battery included in a wireless communication device can be resolved.

Further, in this embodiment mode, the wireless charging antenna 109 is provided and the efficiency of receiving electric power by receiving an electromagnetic wave with the use of the wireless charging antenna 109 is high compared to the antenna 101 described in Embodiment Mode 1, so that the battery can be further saved. An example thereof is shown in FIG. 7.

Figure 3:
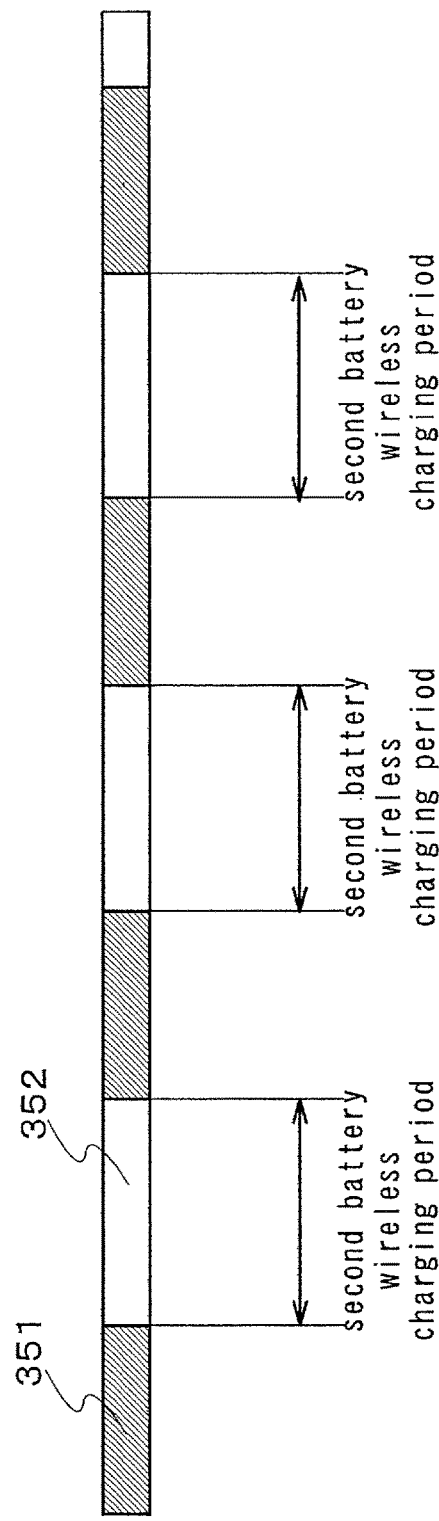
FIGS. 3A to 3C are diagrams describing the structure of Embodiment Mode 1.
Figure 7:
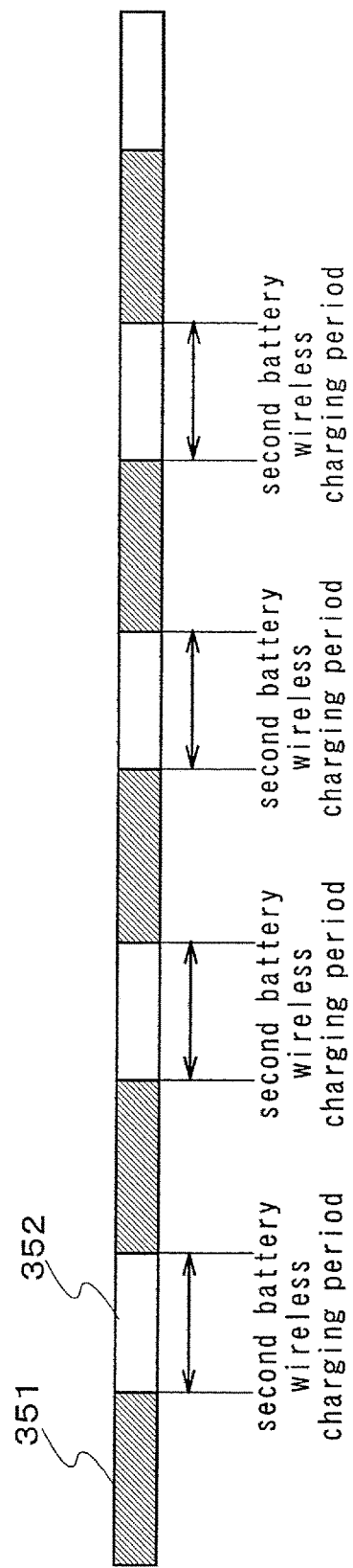
FIG. 7 is a diagram describing the structure of Embodiment Mode 2.

In FIG. 7, since the efficiency of receiving electric power by receiving an electromagnetic wave is higher than that of the example of FIG. 3 described in Embodiment Mode 1, a period of time required for charging all the capacity of the second battery 108 can be reduced. As an example, in FIG. 7, description is made under condition that a period of time for charging all of the electric power storage capacity of the second battery 108 is equal to a period of time for using (20) of the electric power storage capacity of the first battery 104. In the example of FIGS. 3A to 3C described in Embodiment Mode 1, the sum of electric power storage capacity of the first battery and the second battery is almost (200). In this embodiment mode, as shown in FIG. 7, since charging and discharging are performed in accordance to the flow chart of FIG. 2, the discharging 351 of the second battery and the discharging 352 of the first battery are performed alternately, and during the period in which the first battery is discharged, the second battery is charged, so that the sum of electric power storage capacity of the batteries can be almost (225). That is, by using the wireless charging antenna 109 having higher efficiency of receiving electric wave than the antenna 101, a more advantageous effect can be produced in resolving the problem of the short operating period of time.

As described above, by the electric power charge and discharge system of the present invention, improvement of hours of use of a battery can be achieved. Therefore, the frequency of carrying along an AC adapter for charging the battery can be reduced.

Further, by the electric power charge and discharge system of the present invention, a battery can be charged noncontactly without using a battery charger. Therefore, an electronic device can be driven even in the state where an AC adapter for charging the battery does not exist.

Note that this embodiment mode can be implemented in combination with any of the other embodiment modes in this specification.

Embodiment Mode 3

In this embodiment mode, a structure of the wireless communication device which performs the electric power charge and discharge system of the present invention described in Embodiment Mode 1, in which a charge switching circuit is provided in a wireless charging portion, is described below with reference to drawings. Note that in the drawings used in this embodiment mode, the same portions as Embodiment Mode 1 are denoted by the same reference numerals in some cases.

Figure 5:
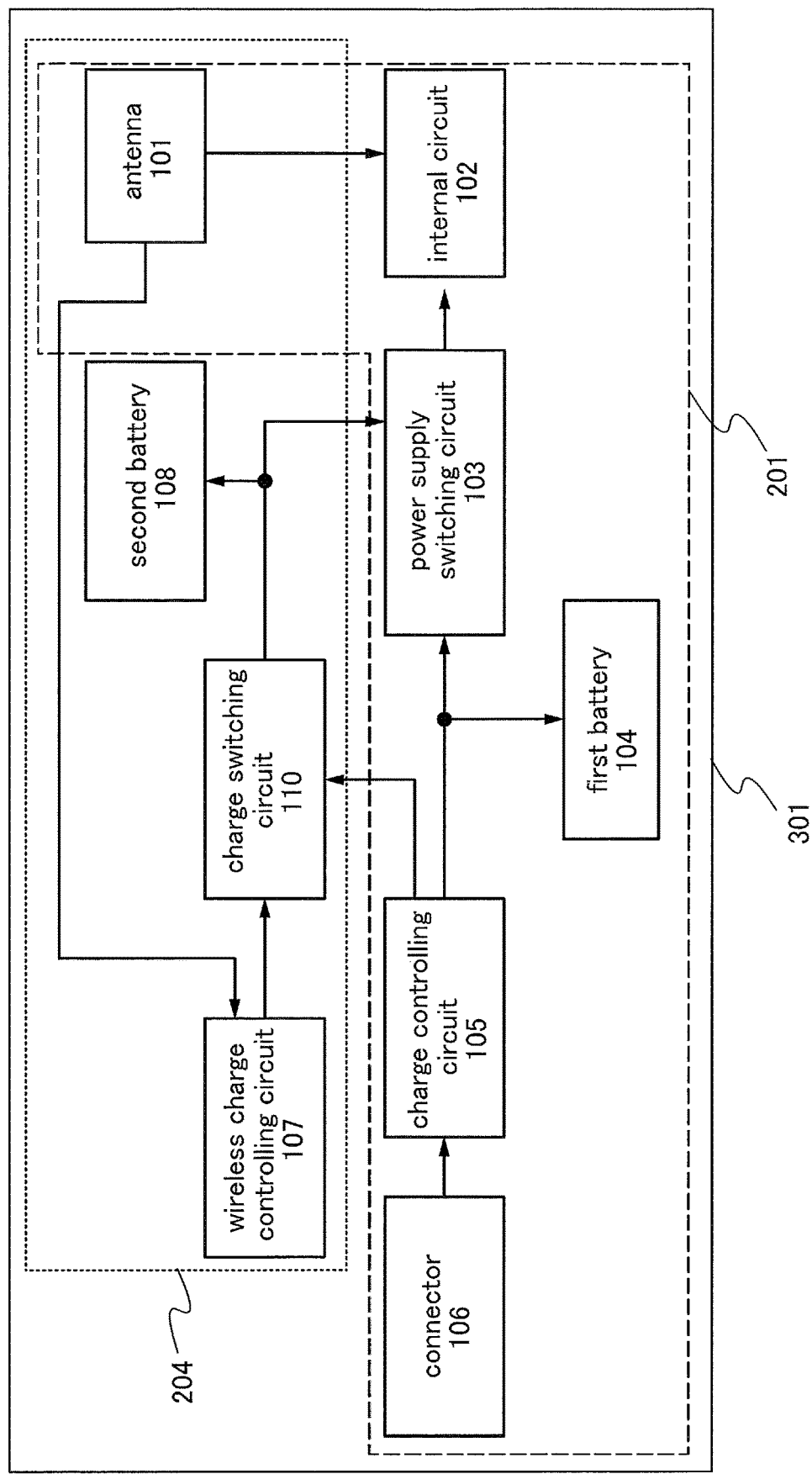
FIG. 5 is a diagram showing a structure of Embodiment Mode 3.

FIG. 5 is a block diagram of the wireless communication device which performs the electric power charge and discharge system of the present invention. In FIG. 5, the wireless communication device 301 includes the wireless driving portion 201 and a wireless charging portion 204. The wireless driving portion 201 includes the antenna 101, the internal circuit 102, the power supply switching circuit 103, the first battery 104, the charge controlling circuit 105, and the connector 106. The wireless charging portion 204 includes the antenna 101, the wireless charge controlling circuit 107, the second battery 108, and a charge switching circuit 110.

The antenna 101 shown in FIG. 5 performs signal transmission and reception when the wireless communication device 301 performs wireless communication, and corresponds to a system determined by its wireless communication standard. As the antenna 101, a loop antenna, a dipole antenna, a slot antenna, a monopole antenna, a notch antenna, a patch antenna, or the like can be used. The shape of the antenna may be selected in accordance with the system determined by the wireless communication standard; in accordance with the wireless communication standard, an antenna with the optimal length and shape may be provided.

The internal circuit 102 shown in FIG. 5 demodulates a wireless communication signal received by the antenna 101, and performs an operation specified in the wireless communication device 301. Further, when signal transmission from the wireless communication device 301 is performed as needed, a transmission signal is modulated and transmitted to the antenna 101 as a transmission signal. Electric power required for operating the internal circuit 102 is supplied by either of the first battery 104 and the second battery 108 selected by the power supply switching circuit 103.

The first battery 104 shown in FIG. 5 is selected by the power supply switching circuit 103 to supply electric power as an operating power supply of the internal circuit 102.

The charge controlling circuit 105 shown in FIG. 5 converts an AC signal supplied from the connector 106 into a DC signal so as to be a voltage which can charge the first battery 104. As an example of the charge controlling circuit 105, a rectifier circuit, a constant voltage circuit, a constant current circuit, and a diode are provided. The rectifier circuit mainly includes a diode and a smoothing capacitor. The rectifier circuit may be provided with a resistor or a capacitor in order to adjust the impedance. The constant voltage circuit and the constant current circuit convert a signal from the connector 106 to a signal for charging the first battery 104. The diode is provided in order to prevent leaks of electric power from the first battery.

Note that although the case where one wireless charge controlling circuit 107 and one second battery 108 are provided in the wireless charging portion 203, other than the antenna 101 which is shared with the wireless driving portion 201 is described in this embodiment mode, pluralities of the wireless charge controlling circuits 107 and the second batteries 108 may be provided as well. By providing pluralities of the wireless charge controlling circuits 107 and the second batteries 108, charging capability of the wireless communication device 301 can be improved.

Further, in the present invention, the first battery 104 and the second battery 108 refer to charging means which can restore a continuous operating period of time by being charged. A secondary battery, a capacitor, and the like can be given as examples of the charging means, which are generically referred to as a battery in this specification. A battery formed with a sheet shape is preferably used as the battery although depending on an intended use. For example, reduction in size is possible with the use of a lithium battery, preferably a lithium polymer battery that uses a gel electrolyte, a lithium ion battery, or the like. Needless to say, any battery may be used as long as it can be charged, and a battery that can be charged and discharged, such as a nickel-metal hydride battery, a nickel cadmium battery, an organic radical battery, a lead storage battery, an air secondary battery, a nickel zinc battery, or a silver zinc battery may be used. Alternatively, a high-capacity capacitor or the like may be used.

It is to be noted that as a high-capacity capacitor that can be used as each of the first battery 104 and the second battery 108 of the present invention, it is preferable to use a capacitor having large opposed areas of electrodes. It is preferable to use a double-layer electrolytic capacitor formed using an electrode material having a large specific surface area, such as activated carbon, fullerene, or a carbon nanotube. As compared with a battery, a capacitor has a simple structure and is easily formed to be thin and stacked. A double-layer electrolytic capacitor is preferable because it has a function of charging, does not deteriorate much even if the frequencies of charging and discharging are increased, and is excellent in rapid charging property.

The charge switching circuit 110 is a circuit to switch electric power supplied to the second battery 108 from electric power of the wireless charge controlling circuit 107 to electric power of the charge controlling circuit 105 when a voltage of a fixed power supply is inputted to the connector 106 and electric power is supplied from the charge controlling circuit 105. Electric power supplied from the wireless charge controlling circuit 107 to the second battery 108 is faint as compared to electric power inputted through the fixed power supply. Therefore, during a period in which current can be supplied from the fixed power supply, it is efficient that electric power to the second battery 108 is also supplied from the charge controlling circuit 105. When the charge controlling circuit 105 does not supply electric power, that is, when electric power supply from the fixed power supply to the connector 106 is stopped, electric power from the wireless charge controlling circuit is supplied again to the second battery 108.

The connector 106 shown in FIG. 5 supplies electric power from the fixed power supply through a cable.

The wireless charge controlling circuit 107 shown in FIG. 5 controls an electromagnetic wave received by the antenna 101 to a voltage which can charge the second battery 108. As an example of the wireless charge controlling circuit 107, a rectifier circuit, a constant voltage circuit, a boosting circuit, and a diode are provided. The rectifier circuit mainly includes a diode and a smoothing capacitor. The rectifier circuit may be provided with a resistor or a capacitor in order to adjust the impedance. The constant voltage circuit and the boosting circuit perform conversion into a voltage for charging the second battery 108. The diode is provided in order to prevent leaks of electric power from the battery.

The second battery 108 shown in FIG. 5 is selected by the power supply switching circuit 103 to supply electric power as an operating power supply of the internal circuit 102. Note that description is made hereinafter under the following condition: the electric power storage capacity of the second battery 108 is smaller than that of the first battery 104 and the electric power storage capacity is different in the first battery 104 and the second battery 108.

Figure 8:
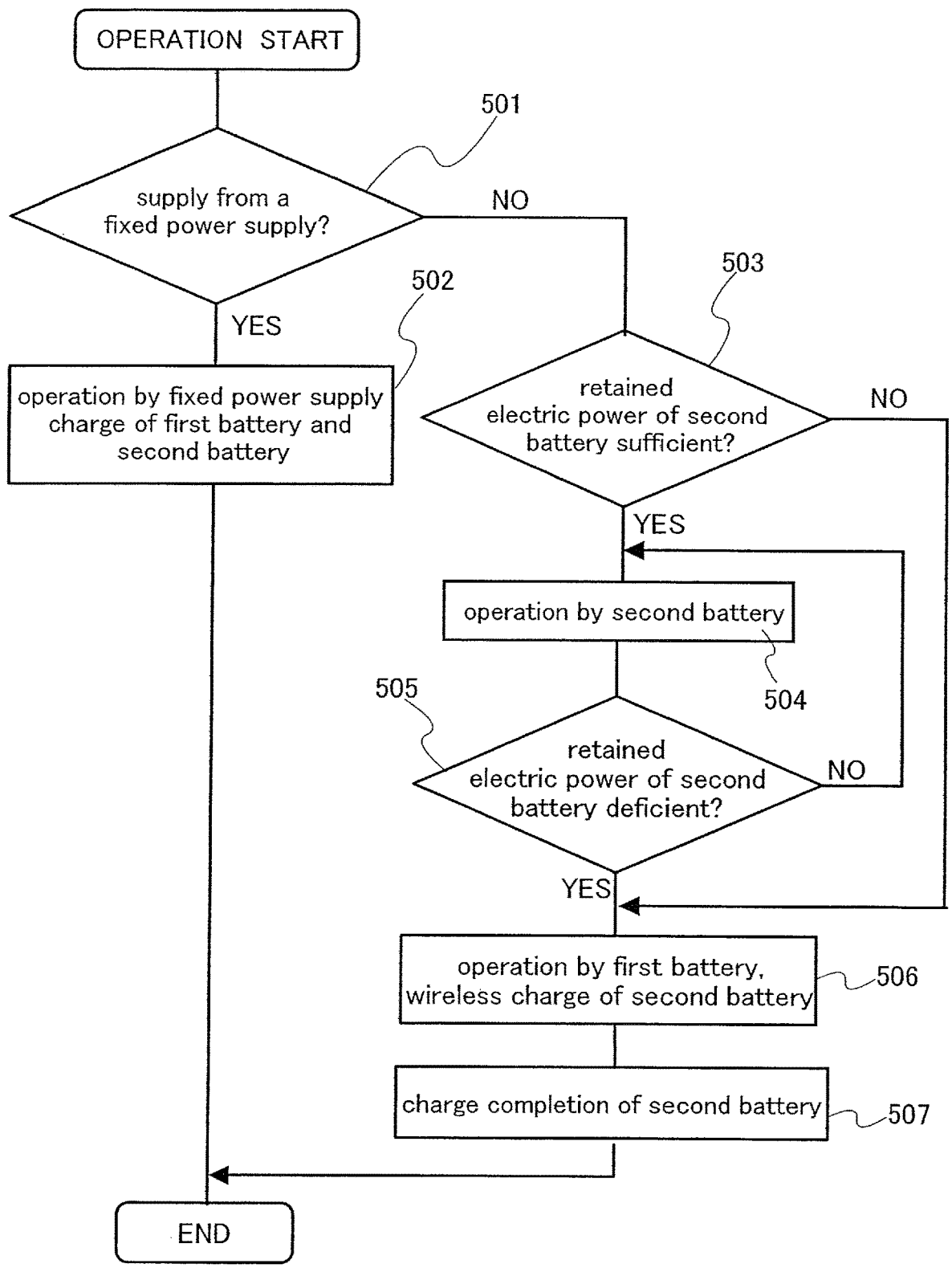
FIG. 8 is a chart describing the structure of Embodiment Mode 3.

An operation example of this embodiment mode is described using a flow chart of FIG. 8. Whether or not electric power is being supplied from the fixed power supply through the connector 106 is judged (STEP 501). In the case where electric power is being supplied from the fixed power supply (followed by "YES" of STEP 501), the internal circuit 102 is operated by using the electric power from the fixed power supply, and the first battery 104 is charged by electric power transmitted from the connector 106 to the charge controlling circuit 105. In addition, an electric power supply source to the second battery 108 is changed from the wireless charge controlling circuit 107 to the charge controlling circuit 105 by the charge switching circuit 110 and charging is performed (STEP 502).

In the case where electric power is not being supplied through the fixed power supply in STEP 501 in FIG. 8

(followed by "NO" of STEP 501), whether or not the electric power capacitance of the second battery 108 is enough to operate the internal circuit 102 is judged (STEP 503). Here, in the case where it is judged that the electric power capacitance of the second battery 108 is enough to operate the internal circuit 102 (followed by "YES" of STEP 503), the power supply switching circuit 103 selects the second battery 108 as an electric power supply source to the internal circuit 102 and operates the internal circuit 102 (STEP 504). In the case where it is judged that the electric power capacitance of the second battery 108 is not enough to operate the internal circuit 102 (followed by "NO" of STEP 503), the power supply switching circuit 103 selects the first battery 104 as an electric power supply source to the internal circuit 102 and operates the internal circuit 102 (STEP 506). At STEP 506, the second battery 108 is charged by receiving an electromagnetic wave with a wireless signal by an operation of the wireless charging portion 202. Note that when the internal circuit 102 is operated by electric power supplying from the second battery 108 at STEP 504, in the case where the electric power capacitance of the second battery 108 is low (followed by "YES" of STEP 505), STEP 506 follows. On the other hand, when the internal circuit 102 is operated by electric power supplying from the second battery 108 at STEP 504, in the case where the electric power capacitance of the second battery 108 is enough (followed by "NO" of STEP 505), STEP 504 follows. Then, at the time when the electric power storage capacitance of the second battery 108 reaches enough electric power storage capacitance to operate the internal circuit 102 by charging with electromagnetic waves existing in an external space, which are supplied from the antenna, charging is completed (STEP 507).

As described above, by the electric power charge and discharge system of the present invention, improvement in hours of use of a battery can be achieved. Therefore, the frequency of carrying along an AC adapter for charging the battery can be reduced.

Further, by the electric power charge and discharge system of the present invention, a battery can be charged noncontactly without using a battery charger. Therefore, an electronic device can be driven even in the state where an AC adapter for charging the battery does not exist.

Note that this embodiment mode can be implemented in combination with any of the other embodiment modes in this specification.

Embodiment Mode 4

In this embodiment mode, a structure of the wireless communication device which performs the electric power charge and discharge system of the present invention described in Embodiment Mode 2, in which a charge switching circuit is provided in a wireless charging portion, is described below with reference to drawings. Note that in the drawings used in this embodiment mode, the same portions as Embodiment Mode 2 are denoted by the same reference numerals in some cases.

Figure 6:
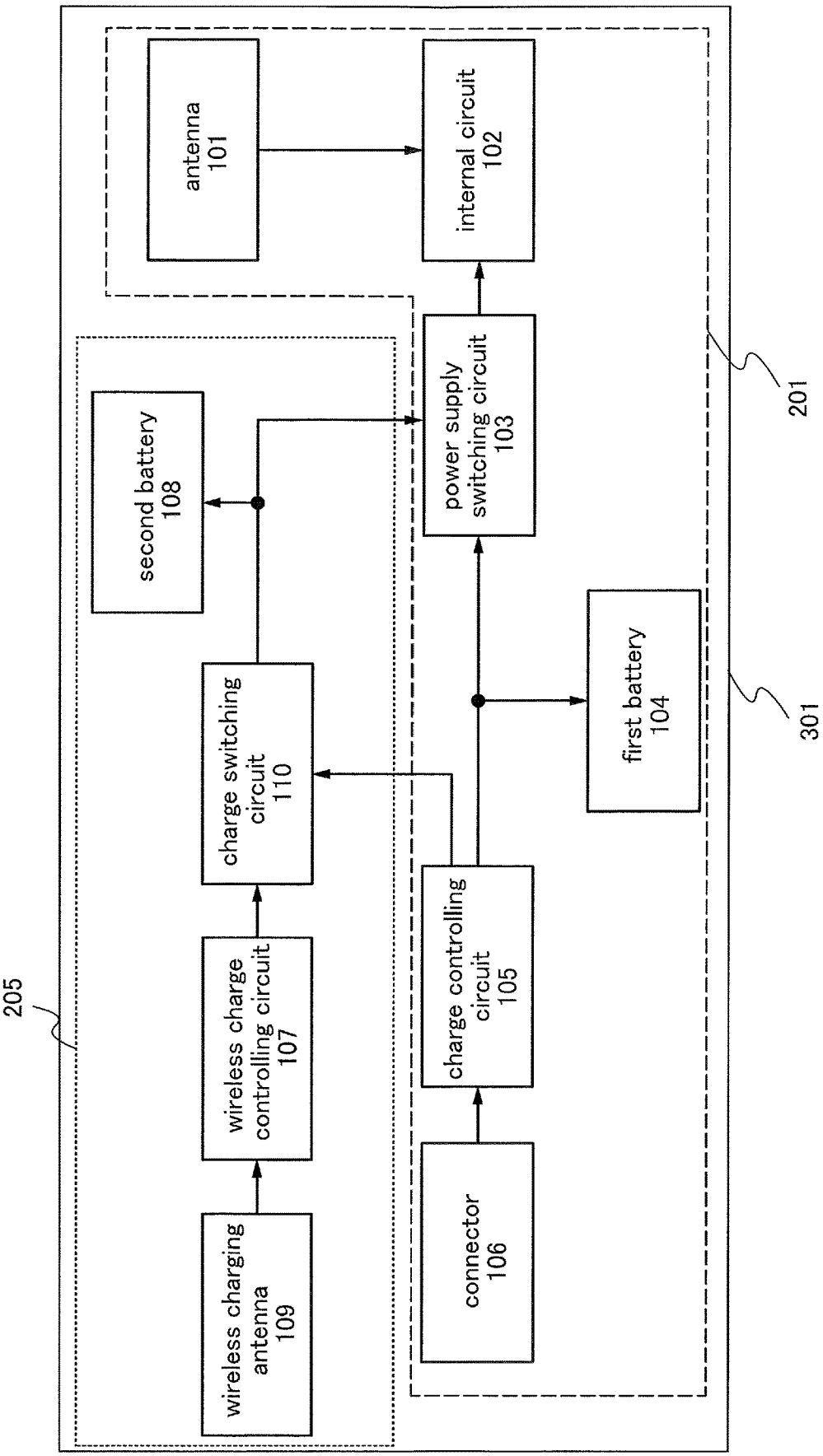
FIG. 6 is a diagram showing a structure of Embodiment Mode 4.

FIG. 6 is a block diagram of the wireless communication device which performs the electric power charge and discharge system of the present invention. In FIG. 6, the wireless communication device 301 includes the wireless driving portion 201 and a wireless charging portion 205. The wireless driving portion 201 includes the antenna 101, the internal circuit 102, the power supply switching circuit 103, the first battery 104, the charge controlling circuit 105, and the connector 106. The wireless charging portion 205 includes the wireless charge controlling circuit 107, the second battery 108, the wireless charging antenna 109, and the charge switching circuit 110.

The antenna 101 shown in FIG. 6 performs signal transmission and reception when the wireless communication device 301 performs wireless communication, and corresponds to a system determined by its wireless communication standard. As the antenna 101, a loop antenna, a dipole antenna, a slot antenna, a monopole antenna, a notch antenna, a patch antenna, or the like can be used. The shape of the antenna may be selected in accordance with the system determined by the wireless communication standard; in accordance with the wireless communication standard, an antenna with the optimal length and shape may be provided.

The internal circuit 102 shown in FIG. 6 demodulates a wireless communication signal received by the antenna 101, and performs an operation specified in the wireless communication device 301. Further, when signal transmission from the wireless communication device 301 is performed as needed, a transmission signal is modulated and transmitted to the antenna 101 as a transmission signal. Electric power required for operating the internal circuit 102 is supplied by either of the first battery 104 and the second battery 108 selected by the power supply switching circuit 103.

The first battery 104 shown in FIG. 6 is selected by the power supply switching circuit 103 to supply electric power as an operating power supply of the internal circuit 102.

The charge controlling circuit 105 shown in FIG. 6 converts an AC signal supplied from the connector 106 into a DC signal so as to be a voltage which can charge the first battery 104. As an example of the charge controlling circuit 105, a rectifier circuit, a constant voltage circuit, a constant current circuit, and a diode are provided. The rectifier circuit mainly includes a diode and a smoothing capacitor. The rectifier circuit may be provided with a resistor or a capacitor in order to adjust the impedance. The constant voltage circuit and the constant current circuit convert a signal from the connector 106 to a signal for charging the first battery 104. The diode is provided in order to prevent leaks of electric power from the first battery.

Note that although the case where one wireless charge controlling circuit 107 and one second battery 108 are provided in the wireless charging portion 205 is described in this embodiment mode, pluralities of the wireless charge controlling circuits 107 and the second batteries 108 may be provided as well. By providing pluralities of the wireless charge controlling circuits 107 and the second batteries 108, charging capability of the wireless communication device 301 can be improved.

Further, in the present invention, the first battery 104 and the second battery 108 refer to charging means which can restore a continuous operating period of time by being charged. A secondary battery, a capacitor, and the like can be given as examples of the charging means, which are generically referred to as a battery in this specification. A battery formed with a sheet shape is preferably used as the battery although depending on an intended use. For example, reduction in size is possible with the use of a lithium battery, preferably a lithium polymer battery that uses a gel electrolyte, a lithium ion battery, or the like. Needless to say, any battery may be used as long as it can be charged, and a battery that can be charged and discharged, such as a nickel-metal hydride battery, a nickel cadmium battery, an organic radical battery, a lead storage battery, an air secondary battery, a nickel zinc battery, or a silver zinc battery may be used. Alternatively, a high-capacity capacitor or the like may be used.

It is to be noted that as a high-capacity capacitor that can be used as each of the first battery 104 and the second battery 108 of the present invention, it is preferable to use a capacitor having large opposed areas of electrodes. It is preferable to use a double-layer electrolytic capacitor formed using an electrode material having a large specific surface area, such as activated carbon, fullerene, or a carbon nanotube. As compared with a battery, a capacitor has a simple structure and is easily formed to be thin and stacked. A double-layer electrolytic capacitor is preferable because it has a function of charging, does not deteriorate much even if the frequencies of charging and discharging are increased, and is excellent in rapid charging property.

The charge switching circuit 110 is a circuit to switch electric power supplied to the second battery 108 from electric power of the wireless charge controlling circuit 107 to electric power of the charge controlling circuit 105 when a voltage of a fixed power supply is inputted to the connector 106 and electric power is supplied from the charge controlling circuit 105. Electric power supplied from the wireless charge controlling circuit 107 to the second battery 108 is faint as compared to electric power inputted through the fixed power supply. Therefore, during a period in which current can be supplied from the fixed power supply, it is efficient that electric power to the second battery 108 is also supplied from the charge controlling circuit 105. When the charge controlling circuit 105 does not supply electric power, that is, when electric power supply from the fixed power supply to the connector 106 is stopped, electric power from the wireless charge controlling circuit is supplied again to the second battery 108.

The connector 106 shown in FIG. 6 supplies electric power from the fixed power supply through a cable.

The wireless charge controlling circuit 107 shown in FIG. 6 controls an electromagnetic wave received by the wireless charging antenna 109 to a voltage which can charge the second battery 108. As an example of the wireless charge controlling circuit 107, a rectifier circuit, a constant voltage circuit, a boosting circuit, and a diode are provided. The rectifier circuit mainly includes a diode and a smoothing capacitor. The rectifier circuit may be provided with a resistor or a capacitor in order to adjust the impedance. The constant voltage circuit and the boosting circuit perform conversion into a voltage for charging the second battery 108. The diode is provided in order to prevent leaks of electric power from the battery.

The second battery 108 shown in FIG. 6 is selected by the power supply switching circuit 103 to supply electric power as an operating power supply of the internal circuit 102. Note that description is made hereinafter under the following condition: the electric power storage capacity of the second battery 108 is smaller than that of the first battery 104 and the electric power storage capacity is different in the first battery 104 and the second battery 108.

The wireless charging antenna 109 shown in FIG. 6 is an antenna only for charging the second battery 108, and it is not necessarily an antenna corresponding to a standard of the wireless communication device 301 and is not necessarily the same as the antenna 101. As the wireless charging antenna 109, a loop antenna, a dipole antenna, a slot antenna, a monopole antenna, a notch antenna, a patch antenna, or the like can be used. The shape of the antenna may be selected in accordance with the system determined by the wireless communication standard; in accordance with the wireless communication standard, an antenna with the optimal length and shape may be provided.

The present invention described in this embodiment mode can be operated in accordance with the flow chart of FIG. 8 as described in Embodiment Mode 3. Therefore, the problem of the short operating period of time of a battery included in a wireless communication device can be resolved. Further, since the wireless charging antenna 109 is provided, as shown in FIG. 7 of Embodiment Mode 2, a more advantageous effect can be produced in resolving the problem of the short operating period of time.

As described above, by the electric power charge and discharge system of the present invention, improvement in hours of use of a battery can be achieved. Therefore, the frequency of carrying along an AC adapter for charging the battery can be reduced.

Further, by the electric power charge and discharge system of the present invention, a battery can be charged noncontactly without using a battery charger. Therefore, an electronic device can be driven even in the state where an AC adapter for charging the battery does not exist.

Note that this embodiment mode can be implemented in combination with any of the other embodiment modes in this specification.

Embodiment Mode 5

In this embodiment mode, a structure of the wireless communication device which performs the electric power charge and discharge system of the present invention described in Embodiment Mode 1, in which an external antenna is provided and wireless communication can be performed by connecting the external antenna to a communication antenna, is described below with reference to drawings. Note that in the drawings used in this embodiment mode, the same portions as Embodiment Mode 1 are denoted by the same reference numerals in some cases.

Figure 9:
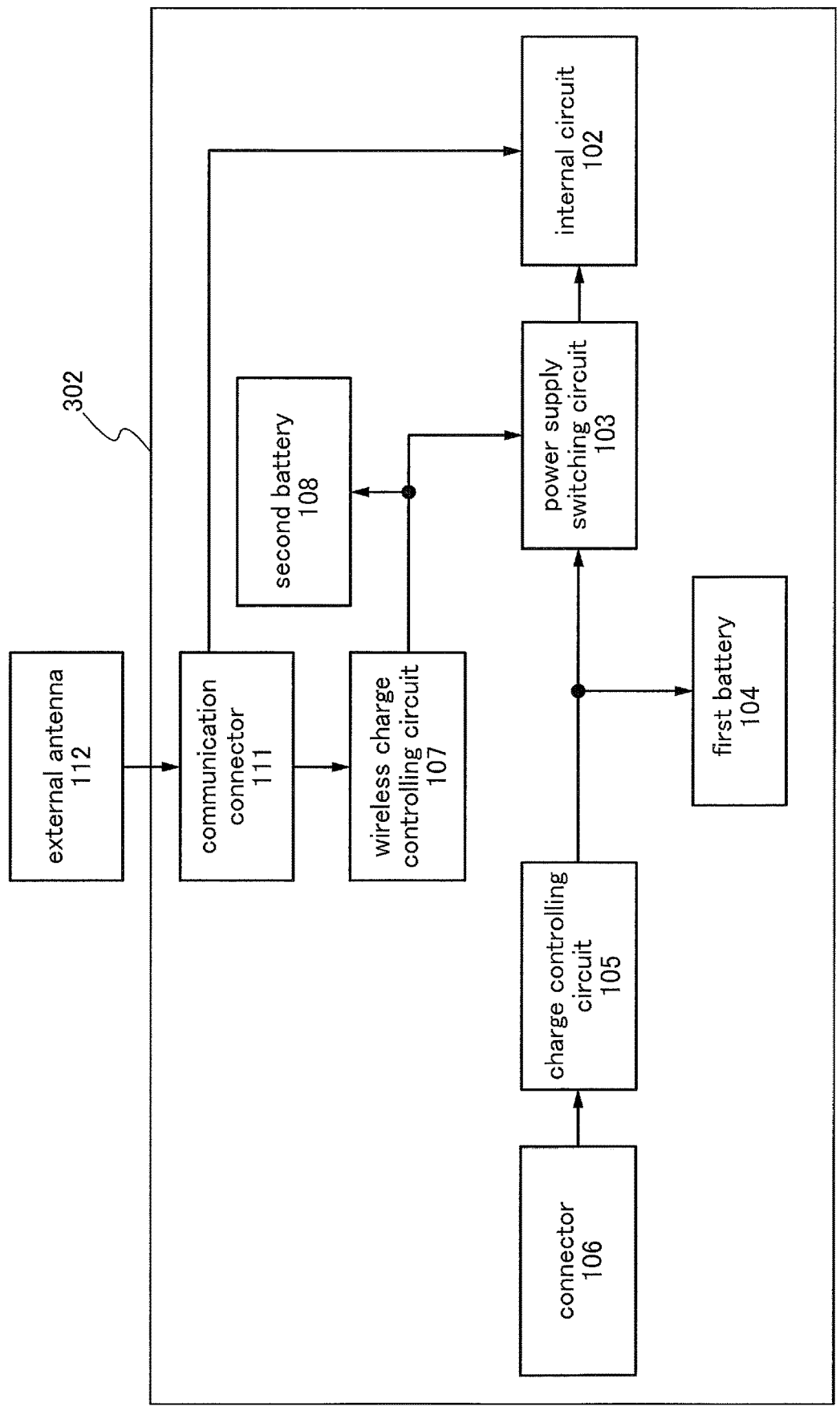
FIG. 9 is a diagram showing a structure of Embodiment Mode 5.

FIG. 9 is a block diagram of the wireless communication device which performs the electric power charge and discharge system of the present invention. In FIG. 9, an electrical device 302 can perform wireless communication by connection between an external antenna 112 and a communication connector 111. The electrical device 302 can also operate alone even in the state where wireless communication is not performed, that is, when the external antenna 112 is not connected to the communication connector 111. In FIG. 9, the electrical device 302 includes a wireless driving portion 211 and a wireless charging portion 206. The wireless driving portion 211 includes the internal circuit 102, the power supply switching circuit 103, the first battery 104, the charge controlling circuit 105, and the connector 106. The wireless charging portion 206 includes the communication connector 111, the wireless charge controlling circuit 107, and the second battery 108.

The internal circuit 102 shown in FIG. 9 is supplied with electric power from the battery selected from the first battery 104 and the second battery 108 by the power supply switching circuit 103 to operate. Further, only in the case of performing wireless communication, transmission and reception of wireless communication signals are performed with the external antenna 112 through the communication connector 111.

The first battery 104 shown in FIG. 9 is selected by the power supply switching circuit 103 to supply electric power as an operating power supply of the internal circuit 102.

The charge controlling circuit 105 shown in FIG. 9 converts an AC signal supplied from the connector 106 into a DC signal so as to be a voltage which can charge the first battery 104. As an example of the charge controlling circuit 105, a rectifier circuit, a constant voltage circuit, a constant current circuit, and a diode are provided. The rectifier circuit mainly includes a diode and a smoothing capacitor. The rectifier circuit may be provided with a resistor or a capacitor in order to adjust the impedance. The constant voltage circuit and the constant current circuit convert a signal from the connector 106 to a signal for charging the first battery 104. The diode is provided in order to prevent leaks of electric power from the first battery.

Further, in the present invention, the first battery 104 and the second battery 108 refer to charging means which can restore a continuous operating period of time by being charged. A secondary battery, a capacitor, and the like can be given as examples of the charging means, which are generically referred to as a battery in this specification. A battery formed with a sheet shape is preferably used as the battery although depending on an intended use. For example, reduction in size is possible with the use of a lithium battery, preferably a lithium polymer battery that uses a gel electrolyte, a lithium ion battery, or the like. Needless to say, any battery may be used as long as it can be charged, and a battery that can be charged and discharged, such as a nickel-metal hydride battery, a nickel cadmium battery, an organic radical battery, a lead storage battery, an air secondary battery, a nickel zinc battery, or a silver zinc battery may be used. Alternatively, a high-capacity capacitor or the like may be used.

It is to be noted that as a high-capacity capacitor that can be used as each of the first battery 104 and the second battery 108 of the present invention, it is preferable to use a capacitor having large opposed areas of electrodes. It is preferable to use a double-layer electrolytic capacitor formed using an electrode material having a large specific surface area, such as activated carbon, fullerene, or a carbon nanotube. As compared with a battery, a capacitor has a simple structure and is easily formed to be thin and stacked. A double-layer electrolytic capacitor is preferable because it has a function of charging, does not deteriorate much even if the frequencies of charging and discharging are increased, and is excellent in rapid charging property.

The connector 106 shown in FIG. 9 supplies electric power from a fixed power supply through a cable.

The wireless charge controlling circuit 107 shown in FIG. 9 controls an electromagnetic wave received by the external antenna 112 to a voltage which can charge the second battery 108 in the case where the external antenna 112 is connected to the communication connector 111. As an example of the wireless charge controlling circuit 107, a rectifier circuit, a constant voltage circuit, a boosting circuit, and a diode are provided. The rectifier circuit mainly includes a diode and a smoothing capacitor. The rectifier circuit may be provided with a resistor or a capacitor in order to adjust the impedance. The constant voltage circuit and the boosting circuit perform conversion into a voltage for charging the second battery 108. The diode is provided in order to prevent leaks of electric power from the battery.

The second battery 108 shown in FIG. 9 is selected by the power supply switching circuit 103 to supply electric power as an operating power supply of the internal circuit 102. Note that description is made hereinafter under the following condition: the electric power storage capacity of the second battery 108 is smaller than that of the first battery 104 and the electric power storage capacity is different in the first battery 104 and the second battery 108.

The present invention described in this embodiment mode can be operated in accordance with the flow chart of FIG. 2 as described in Embodiment Mode 1. Therefore, the problem of the short operating period of time of a battery included in a wireless communication device can be resolved.

As described above, by the electric power charge and discharge system of the present invention, improvement in hours of use of a battery can be achieved. Therefore, the frequency of carrying along an AC adapter for charging the battery can be reduced.

Further, by the electric power charge and discharge system of the present invention, a battery can be charged noncontactly without using a battery charger. Therefore, an electronic device can be driven even in the state where an AC adapter for charging the battery does not exist.

Note that this embodiment mode can be implemented in combination with any of the other embodiment modes in this specification.

Embodiment Mode 6

In this embodiment mode, a structure of the wireless communication device which performs the electric power charge and discharge system of the present invention described in Embodiment Mode 2, in which a charge switching circuit is provided in a wireless charging portion, is described below with reference to drawings. Note that in the drawings used in this embodiment mode, the same portions as Embodiment Mode 2 are denoted by the same reference numerals in some cases.

Figure 10:
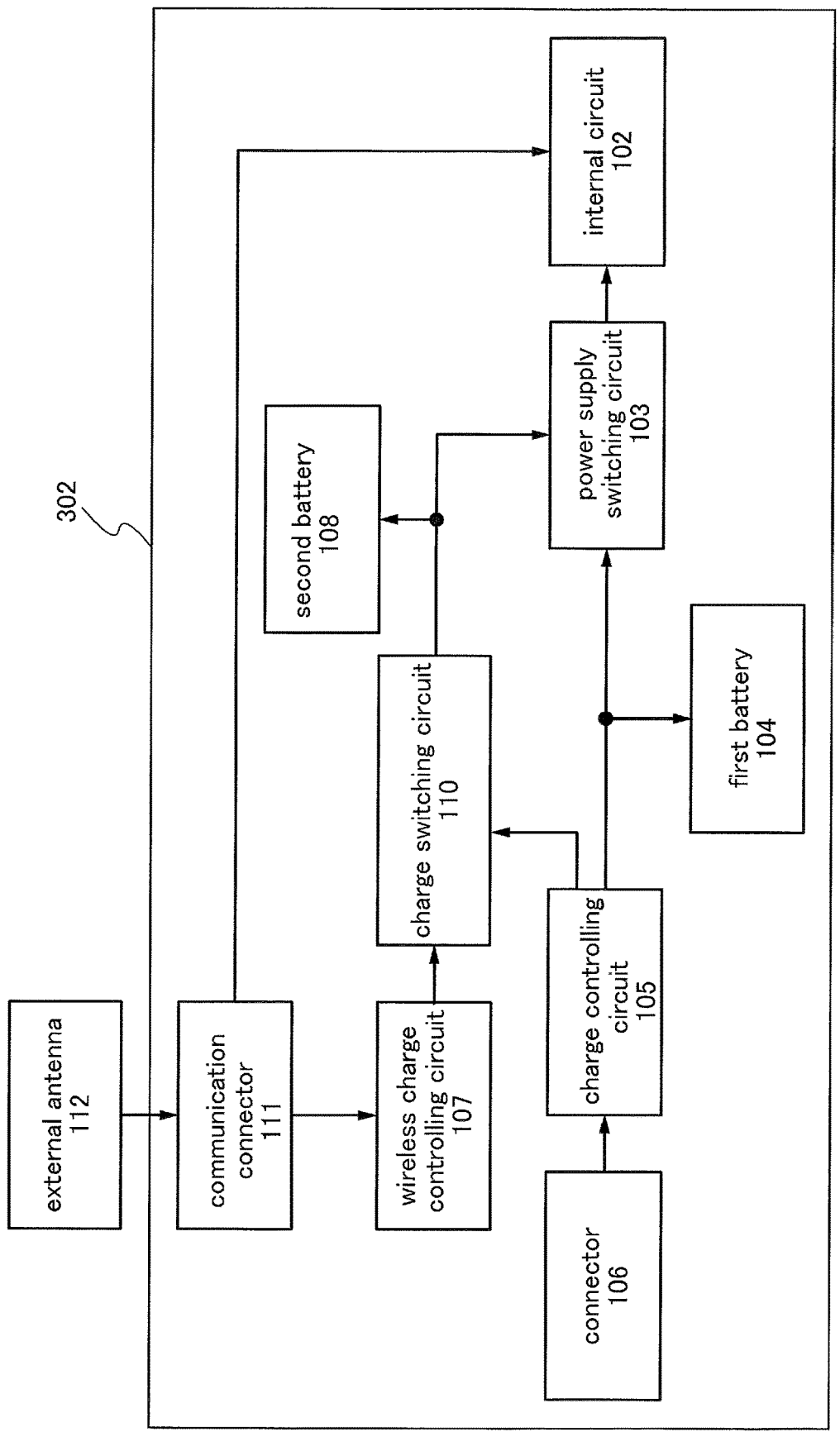
FIG. 10 is a diagram showing a structure of Embodiment Mode 6.

FIG. 10 is a block diagram of the wireless communication device which performs the electric power charge and discharge system of the present invention. In FIG. 10, the electrical device 302 can perform wireless communication by connection between the external antenna 112 and the communication connector 111. The electrical device 302 can also operate alone even in the state where wireless communication is not performed, that is, when the external antenna 112 is not connected to the communication connector 111. In FIG. 10, the electrical device 302 includes the wireless driving portion 211 and a wireless charging portion 207. The wireless driving portion 211 includes the internal circuit 102, the power supply switching circuit 103, the first battery 104, the charge controlling circuit 105, and the connector 106. The wireless charging portion 207 includes the communication connector 111, the wireless charge controlling circuit 107, the second battery 108, and the charge switching circuit 110.

The internal circuit 102 shown in FIG. 10 is supplied with electric power from the battery selected from the first battery 104 and the second battery 108 by the power supply switching circuit 103 to operate. Further, only in the case of performing wireless communication, transmission and reception of wireless communication signals are performed with the external antenna 112 through the communication connector 111.

The first battery 104 shown in FIG. 10 is selected by the power supply switching circuit 103 to supply electric power as an operating power supply of the internal circuit 102.

The charge controlling circuit 105 shown in FIG. 10 converts an AC signal supplied from the connector 106 into a DC signal so as to be a voltage which can charge the first battery 104. As an example of the charge controlling circuit 105, a rectifier circuit, a constant voltage circuit, a constant current circuit, and a diode are provided. The rectifier circuit mainly includes a diode and a smoothing capacitor. The rectifier circuit may be provided with a resistor or a capacitor in order to adjust the impedance. The constant voltage circuit and the constant current circuit convert a signal from the connector 106 to a signal for charging the first battery 104. The diode is provided in order to prevent leaks of electric power from the first battery.

Further, in the present invention, the first battery 104 and the second battery 108 refer to charging means which can restore a continuous operating period of time by being charged. A secondary battery, a capacitor, and the like can be given as examples of the charging means, which are generically referred to as a battery in this specification. A battery formed with a sheet shape is preferably used as the battery although depending on an intended use. For example, reduction in size is possible with the use of a lithium battery, preferably a lithium polymer battery that uses a gel electrolyte, a lithium ion battery, or the like. Needless to say, any battery may be used as long as it can be charged, and a battery that can be charged and discharged, such as a nickel-metal hydride battery, a nickel cadmium battery, an organic radical battery, a lead storage battery, an air secondary battery, a nickel zinc battery, or a silver zinc battery may be used. Alternatively, a high-capacity capacitor or the like may be used.

It is to be noted that as a high-capacity capacitor that can be used as each of the first battery 104 and the second battery 108 of the present invention, it is preferable to use a capacitor having large opposed areas of electrodes. It is preferable to use a double-layer electrolytic capacitor formed using an electrode material having a large specific surface area, such as activated carbon, fullerene, or a carbon nanotube. As compared with a battery, a capacitor has a simple structure and is easily formed to be thin and stacked. A double-layer electrolytic capacitor is preferable because it has a function of charging, does not deteriorate much even if the frequencies of charging and discharging are increased, and is excellent in rapid charging property.

The connector 106 shown in FIG. 10 supplies electric power from a fixed power supply through a cable.

The wireless charge controlling circuit 107 shown in FIG. 10 controls an electromagnetic wave received by the external antenna 112 to a voltage which can charge the second battery 108 in the case where the external antenna 112 is connected to the communication connector 111. As an example of the wireless charge controlling circuit 107, a rectifier circuit, a constant voltage circuit, a boosting circuit, and a diode are provided. The rectifier circuit mainly includes a diode and a smoothing capacitor. The rectifier circuit may be provided with a resistor or a capacitor in order to adjust the impedance. The constant voltage circuit and the boosting circuit perform conversion into a voltage for charging the second battery 108. The diode is provided in order to prevent leaks of electric power from the battery.

The second battery 108 shown in FIG. 10 is selected by the power supply switching circuit 103 to supply electric power as an operating power supply of the internal circuit 102. Note that description is made hereinafter under the following condition: the electric power storage capacity of the second battery 108 is smaller than that of the first battery 104 and the electric power storage capacity is different in the first battery 104 and the second battery 108.

The charge switching circuit 110 is a circuit to switch electric power supplied to the second battery 108 from electric power of the wireless charge controlling circuit 107 to electric power of the charge controlling circuit 105 when a voltage of a fixed power supply is inputted to the connector 106 and electric power is supplied from the charge controlling circuit 105. Electric power supplied from the wireless charge controlling circuit 107 to the second battery 108 is faint as compared to electric power inputted through the fixed power supply. Therefore, during a period in which current can be supplied from the fixed power supply, it is efficient that electric power to the second battery 108 is also supplied from the charge controlling circuit 105. When the charge controlling circuit 105 does not supply electric power, that is, when electric power supply from the fixed power supply to the connector 106 is stopped, electric power from the wireless charge controlling circuit is supplied again to the second battery 108.

The present invention described in this embodiment mode can be operated in accordance with the flow chart of FIG. 8 as described in Embodiment Mode 3. Therefore, the problem of the short operating period of time of a battery included in a wireless communication device can be resolved.

As described above, by the electric power charge and discharge system of the present invention, improvement in hours of use of a battery can be achieved. Therefore, the frequency of carrying along an AC adapter for charging the battery can be reduced.

Further, by the electric power charge and discharge system of the present invention, a battery can be charged noncontactly without using a battery charger. Therefore, an electronic device can be driven even in the state where an AC adapter for charging the battery does not exist.

Note that this embodiment mode can be implemented in combination with any of the other embodiment modes in this specification.

This application is based on Japanese Patent Application Serial No. 2006296964 filed in Japan Patent Office on Oct. 31, 2006, the entire contents of which are hereby incorporated by reference.

What is claimed is:

1. An electronic device comprising:
a first antenna;
a second antenna;
a connector configured to be connected to an external power supply by a wired connection;
a first battery; and
a charge switching circuit configured to switch an electric power supply to the first battery via the first antenna into an electric power supply to the first battery via the connector,
wherein the first battery is configured to be charged by the first antenna when disconnection between the external power supply and the connector is detected.

2. The electronic device according to claim 1, further comprising a second battery configured to be charged by the external power supply via the connector.

3. The electronic device according to claim 1, further comprising a charge controlling circuit configured to convert an AC signal into a DC signal, wherein the charge controlling circuit is electrically connected to the connector.

4. The electronic device according to claim 1, further comprising an internal circuit configured to demodulate a wireless communication signal received by the second antenna.

5. The electronic device according to claim 1, wherein the first battery is a lithium ion battery.

6. An electronic device comprising:
a first antenna;
a second antenna;
a wireless charge controlling circuit electrically connected to the first antenna;
a connector configured to be connected to an external power supply by a wired connection;
a first battery; and a charge switching circuit configured to switch an electric power supply to the first battery via the first antenna into an electric power supply to the first battery via the connector, wherein the first battery is configured to be charged by the first antenna when disconnection between the external power supply and the connector is detected.

7. The electronic device according to claim 6, further comprising a second battery configured to be charged via the connector.

8. The electronic device according to claim 6, further comprising a charge controlling circuit configured to convert an AC signal into a DC signal, wherein the charge controlling circuit is electrically connected to the connector.

9. The electronic device according to claim 6, further comprising an internal circuit configured to demodulate a wireless communication signal received by the second antenna.

10. The electronic device according to claim 6, wherein the first battery is a lithium ion battery.

11. A charging method for an electronic device, comprising:
   charging a first battery by an external power supply via a connector by a wired connection; and
   charging the first battery via an antenna,
   wherein charging the first battery via the antenna begins when disconnection of the connector by the wired connection is detected.

12. The charging method for an electronic device according to claim 11, wherein the first battery is charged by the antenna receiving an external electromagnetic wave.

* * * * *